United States Patent
Chen et al.

(10) Patent No.: US 7,927,415 B2
(45) Date of Patent: Apr. 19, 2011

(54) ZEOLITE STARCH ADHESIVE FOR CORRUGATED CARDBOARDS AND METHOD FOR MAKING THE SAME

(75) Inventors: Yi-Jia Chen, Taipei County (TW); Jui-Min Wang, Taipei (TW); Yi-Chen Tsai, Taipei County (TW)

(73) Assignee: Taiwan Magnetic Innovation Technology, Inc., Hsinchu (TW)

( * ) Notice: Subject to any disclaimer, the term of this patent is extended or adjusted under 35 U.S.C. 154(b) by 127 days.

(21) Appl. No.: 12/430,123

(22) Filed: Apr. 27, 2009

(65) Prior Publication Data

US 2010/0032092 A1    Feb. 11, 2010

(30) Foreign Application Priority Data

Aug. 8, 2008    (TW) .............................. 97130371 A

(51) Int. Cl.
*C09J 103/00*    (2006.01)
(52) U.S. Cl. .................................................. 106/211.1
(58) Field of Classification Search ................ 106/211.1
See application file for complete search history.

(56) References Cited

U.S. PATENT DOCUMENTS

| | | | |
|---|---|---|---|
| 5,286,769 A * | 2/1994 | Eden et al. ...................... | 524/49 |
| 2008/0268224 A1* | 10/2008 | Kim ........................... | 428/304.4 |

* cited by examiner

*Primary Examiner* — David M Brunsman
(74) *Attorney, Agent, or Firm* — Winston Hsu; Scott Margo

(57) ABSTRACT

The present invention relates to a starch adhesive mixed with zeolite powder to provide suitable absorption function for corrugated cardboards, and a method for making the adhesive. The adhesive comprises: corn starch as main ingredient, zeolite powder suitably mixed with said corn starch, water, and additives like caustic soda and borax. The corn starch is mixed with zeolite powder in an amount of zeolite powder being 20~33% of the total weight of corn starch and the zeolite powder, and said adhesive is prepared and adjusted to have a lower gelation temperature. The present invention solves the problem that the initial adhesive strength of adhesive would decrease because of addition of the zeolite powder to the adhesive and would make the drying time longer and then deteriorating the initial adhesive strength. The present invention will make it more efficient and predictable for the mass production of the zeolite starch corrugated cardboards.

7 Claims, 6 Drawing Sheets

ZEOLITE STARCH ADHESIVE FOR CORRUGATED CARDBOARDS AND METHOD FOR MAKING THE SAME

BACKGROUND OF THE INVENTION

1. Field of the Invention

The present invention relates to a corrugated cardboard, an adhesive for corrugated cardboards as well as a method for making the adhesive. In particular, the present invention relates to a moisture-absorptive corrugated cardboard, an adhesive to enhance the properties of corrugated cardboards as well as a method for making the moisture-absorptive adhesive.

2. Description of the Prior Art

The buffer, or shock-absorptive ability of a normal corrugated cardboard, which is mainly for use in the manufacture of package boxes, is usually enhanced by gluing cardboards to both sides tips of corrugated medium with an adhesive. Because the adhesive, usually a starch glue, breaks loose easily, and the strength of the corrugated cardboard boxes drop dramatically after the corrugated cardboard boxes absorb water, they are not suitable for the packaging of moisture-proof items, fresh vegetables and fruits. As shown in FIG. 1, in order to make the corrugated cardboards more moisture-proof, one conventional method is to spray the moisture-proof agent on the surface of inside or outside linerboard of a box. Normally, the moisture-proof agent is a chemical and it is usually toxic. In addition, spraying moisture-proof agent as required increases the cost of production due to extra material cost and procedure.

It is known that addition of zeolite to the outer liner of the corrugated cardboard may make it more moisture-proof and helps the items inside last longer by means of the naturally absorptive zeolite. Zeolite is a common name for the zeolite group, which are crystals of water-containing alkaline metals or alkaline earth metals aluminosilicate. Zeolite is a porous substance with nano-scale pores and holes; pore diameter less than 2 nm is called micropore, 2-50 nm is called mesopore and larger than 50 nm is called macropore. Different types of zeolite has various pore sizes. Molecules smaller than the critical pore size are absorbed but molecules larger than the critical pore size are excluded. This phenomenon is called "molecular sieve." Due to this phenomenon, zeolite may serve as an absorbent with specific surface area up to 1000 $m^2/g$.

It is known that a corrugated cardboard that helps the items inside last longer has a zeolite absorbent film laminated on the inner surface of the corrugated cardboard. The composite film may absorb ethylene gas and keep the moisture inside from evaporation so the items inside may last longer. However, the drawbacks of the product are that it costs extra and takes additional procedures to manufacture the corrugated cardboard so the corrugated cardboard is not compatible with the traditional process. Besides, the product is not popular because of its expensive price.

It is also known that there is another corrugated cardboard with nano-scale gas absorbent powder added during the manufacturing process of the linerboard for the corrugated cardboard to be specifically absorptive. This kind of corrugated cardboard of special specification is beyond the ability of a normal corrugated cardboard factory. Additionally, a layer of glue is needed to be applied on the surface of the outer liner to make the surface much more even and to enhance the quality, which makes it less absorptive. Actually, the corrugated cardboard of special specification can only be optionally produced in smaller batches.

Traditionally, the main ingredient of the adhesive for the corrugated cardboard is corn starch (main starch) and processed starch as a carrier (carrier starch). Two of which are mixed to form the starch adhesive. Usually, caustic soda (NaOH, also known as lye, or sodium hydrate) serves as an auxiliary component for use in gelation to lower the gelation temperature. Short chain starch uses its hydroxyl groups or carbonyl groups to readily form complex with borax so as to increase the initial adhesive strength. Generally speaking, caustic soda is added in an amount of 1-3% of the total weight of the corn starch and, and borax is added in an amount of 0.2-5.0% of the total weight of the corn starch. When the corn starch is mixed with zeolite powder to be the zeolite starch adhesive, the blended adhesive is less adhesive/sticky because of the lower percentage of the corn starch. Simultaneously, the added zeolite powder would make the drying time longer then deteriorate the initial adhesive strength which may increase the initial bonding time. This slows down the production line for corrugated cardboards. Accordingly, the adhesive with corn starch and zeolite powder has lower adhesive speed and simultaneously adhesive failure occurs due to the lower initial adhesive strength during the production of the corrugated cardboard.

After reacting with water, heat and caustic soda, starch reveals the initial adhesion and the permanent adhesive strength of the gel-like starch. The initial adhesion plays a crucial role during the production process because it determines the adhesive speed. Generally, in order to increase the adhesive speed, more caustic soda is added to lower the gelation temperature. However, although the addition of caustic soda may lower the gelation temperature in short term, it also adversely makes the adhesion unstable in the long run.

By lowering down the production line speed and increasing the amount of adhesive applied on the corrugated cardboard, the adhesive with zeolite powder as an additive may in one aspect increase the initial adhesive strength but in another aspect it also slows down the production, which fails to meet the demands of industrial interests. Moreover, if the production line speed is too much slower, the overly high temperature rather makes the adhesive pre-maturely dry out so the adhesive fails to be adhesive or sticky enough and even the layers of corrugated cardboard are parted by giving a simple pat.

Furthermore, the price or the adhesive speed, which may influence the production of the corrugated cardboard, are still issues to be considered because different kinds of starch have different physical properties when using zeolite powder as an additive in the mixed adhesive for bonding the corrugated cardboard. Practically speaking, neither should starch with good adhesive speed be replaced nor can starch with high amylose content be used because they are much more expensive than raw starch.

It is expected that corrugated cardboard may be even more widely useful if normal materials rather than particular materials are used in a production line to obtain a satisfying product.

Although in the recent years the production speed of the corrugator is greatly improved, the adhesive speed is not optimal because the adhesive is added with zeolite powder. An adhesive containing zeolite powder with better adhesive speed is still needed for industrial application.

SUMMARY OF THE INVENTION

The primary object of the present invention is to overcome the drawbacks and insufficiencies of the current adhesive with zeolite powder for corrugated cardboard and also to provide an absorptive starch adhesive mixed with zeolite powder for use in corrugated cardboard.

The second object of the present invention is to provide a method to make an absorptive adhesive for use in corrugated cardboard.

The absorptive starch adhesive mixed with zeolite powder for use in corrugated cardboards of the present invention includes corn starch as the main ingredient as well as zeolite powder suitably mixed with the corn starch, water, and additives such as caustic soda and borax. The zeolite powder which is mixed with corn starch is in an amount of 20-33% of the total weight of the mixture of corn starch and zeolite powder. The adhesive of the present invention is prepared and adjusted to have a lower gelation temperature to compensate the longer drying time resulted from the additional zeolite powder mixed with the starch in the adhesive.

In accordance with the present invention, the porous corn starch has an average pore size of 0.3-1 μm.

In accordance with the present invention, the zeolite powder is added in an amount of 30% of the total weight of the corn starch and the zeolite powder.

In accordance with the present invention, the caustic soda is in an amount of 1-3%, the borax is in an amount of 0.2-5%, of the total weight of the corn starch and the zeolite powder.

In accordance with the present invention, the porous starch of the average pore size of 0.3-1 μm is obtained by partial conversion of the corn starch by the addition of glucoamylase.

In accordance with the present invention, 20-33% more of an originally expected amount of caustic soda is added and a stabilizer is added in an amount of 1% of the total weight of the corn starch and the zeolite powder to stabilize the absorptive adhesive with the additional caustic soda.

In accordance with the present invention, the caustic soda may be replaced with a suitable base, such as an alkaline silicate.

The present invention further provides a method for making an absorptive adhesive for corrugated cardboards, including:

mixing and stirring porous corn starch with zeolite powder in an amount of zeolite powder being 20-33% of the total weight of the mixture of the porous starch and the zeolite powder in water so that the porous corn starch and the zeolite powder are properly dispersed in the water;

adding caustic soda in an amount of 1-3% of the total weight of the mixture of the corn starch and the zeolite powder into the water, and stirring; and adding borax in an amount of 0.2-5% of the total weight of the mixture of the starch and the zeolite powder into the water, and stirring.

In accordance with the present invention, the zeolite powder is added in an amount of 30% of the total weight of the starch and the zeolite powder.

In accordance with the present invention, the ratio of the water to the total weight of the starch and the zeolite powder is between 1.5-5 when mixing porous corn starch with zeolite powder in water.

In accordance with the present invention, the porous starch has an average pore size of 0.3-1 μm.

In accordance with the present invention, the porous starch of the average pore size of 0.3-1 μm is obtained by partial conversion of the starch by adding glucoamylase. The partial conversion of the starch includes:

adding a glucoamylase solution into a corn starch solution and stirring to carry out the conversion;

drying the starch after the partial conversion to obtain a primary-treatment product;

washing the primary-treatment product to remove products of the starch resulted from the partial conversion;

drying the starch after washing again to obtain the porous starch.

In accordance with the present invention, the corn starch solution has a weight percent concentration of 40-50%.

In accordance with the present invention, the glucoamylase is added in an amount of 0.02-0.5% of the total weight of the starch.

In accordance with the present invention, the conversion is carried out under a pH value between 4-6 and under a temperature between 40-60° C.

In accordance with the present invention, the caustic soda is replaced with a base such as an alkaline silicate.

The present invention proposes another method for making an absorptive adhesive for corrugated cardboards, including:

mixing and sufficiently stirring starch with zeolite powder in an amount of zeolite powder being 20-33% of the total weight of the mixture of the porous starch and the zeolite powder in water so that the starch and the zeolite powder are properly dispersed in the water;

adding caustic soda in an originally expected amount of 1-3% of the total weight of the mixture of the starch and the zeolite powder, and further adding caustic soda in an additional amount of 20-33% more of the originally expected amount into the water and stirring;

adding and stirring borax in an amount of 0.2-5% of the total weight of the mixture of the corn starch and the zeolite powder into the water, and stirring.

In accordance with the present invention, the ratio of the water to the total weight of the corn starch and the zeolite powder is between 1.5-5 when mixing the corn starch with the zeolite powder in the water.

In accordance with the present invention, a stabilizer is added in an amount of 1% of the total weight of the starch and the zeolite powder to stabilize the absorptive adhesive.

In accordance with the present invention, the caustic soda may be replaced with a base such as an alkaline silicate.

The present invention in another aspect proposes a method for making a corrugated cardboard, which is made of the above-mentioned absorptive adhesive. The method of the present invention includes:

preparing the absorptive adhesive for corrugated cardboards as mentioned above;

applying the absorptive adhesive for corrugated cardboards onto both sides of a corrugated medium; and obtaining the corrugated cardboard by thermal lamination of the corrugated medium, a inner liner and a outer liner.

The adhesive that some of the starch is replaced with zeolite powder for corrugated cardboards of the present invention retains its initial bonding time and lowers the cost for production. This adhesive is suitable for use in the high speed production line of corrugated cardboards to increase the productive efficiency. Further, the anti-humid ability is much more enhanced due to the absorptive molecular sieve feature.

These and other objectives of the present invention will no doubt become obvious to those of ordinary skill in the art after reading the following detailed description of the preferred embodiment that is illustrated in the various figures and drawings.

DETAILED DESCRIPTION

The present invention mixes zeolite with porous starch treated by enzyme or adds additional caustic soda to make an adhesive for corrugated cardboards. The present invention solves the problem of lower adhesive when zeolite mixes with starch adhesive. The present invention also retains the same initial bonding time so that the production of the corrugated cardboard may keep the same speed or even higher.

After repeated tests, it has been found that although the addition of zeolite powder does not substantially influence the gelation temperature, however, it adversely lower the adhesion and prolong the initial bonding time. This problem can be solved by changing the characteristics of the starch (porous starch) or adding extra more caustic soda. Optionally, stabilizing agent may be added to make the adhesive more stable for a longer period of time after extra more caustic soda is added.

Figure 1:
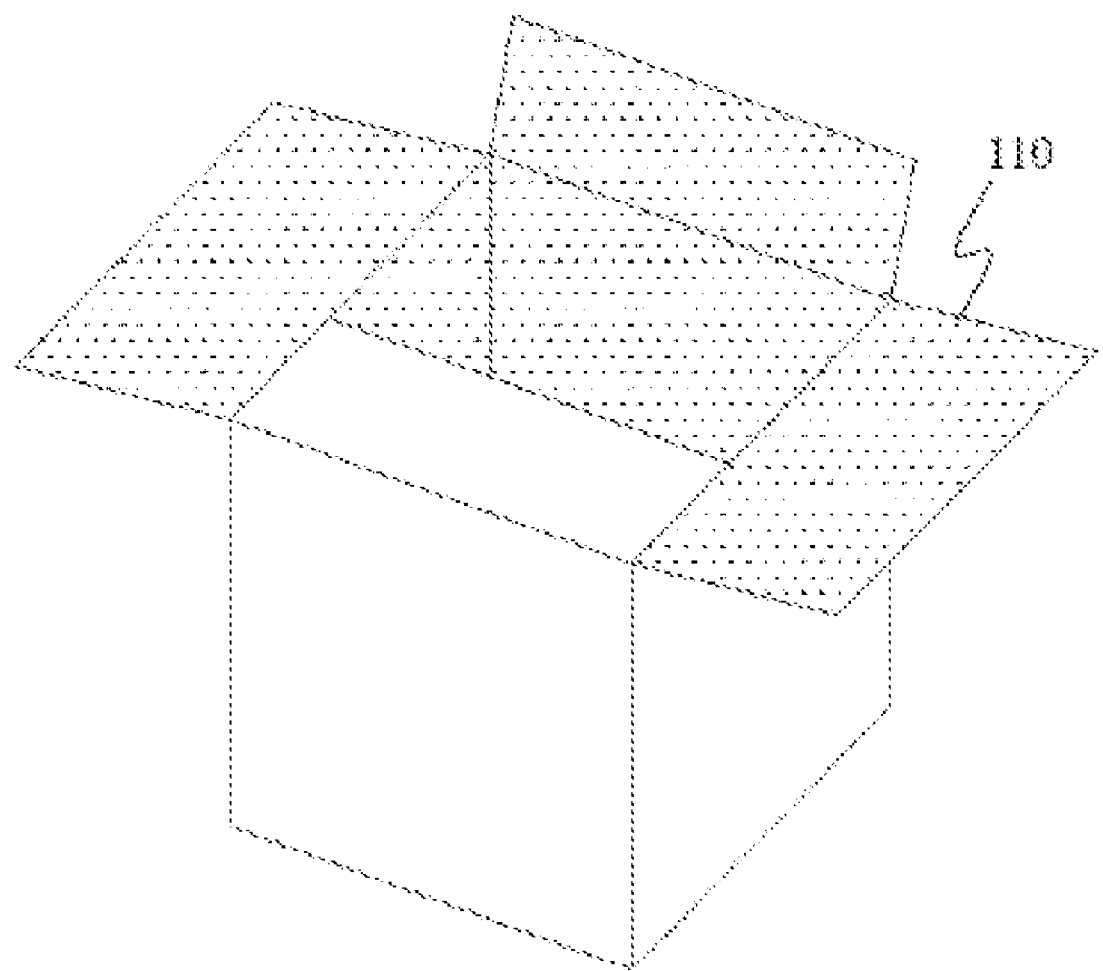
FIG. 1 illustrates a conventional corrugated cardboard box with moisture-proof agent.
Figure 2:
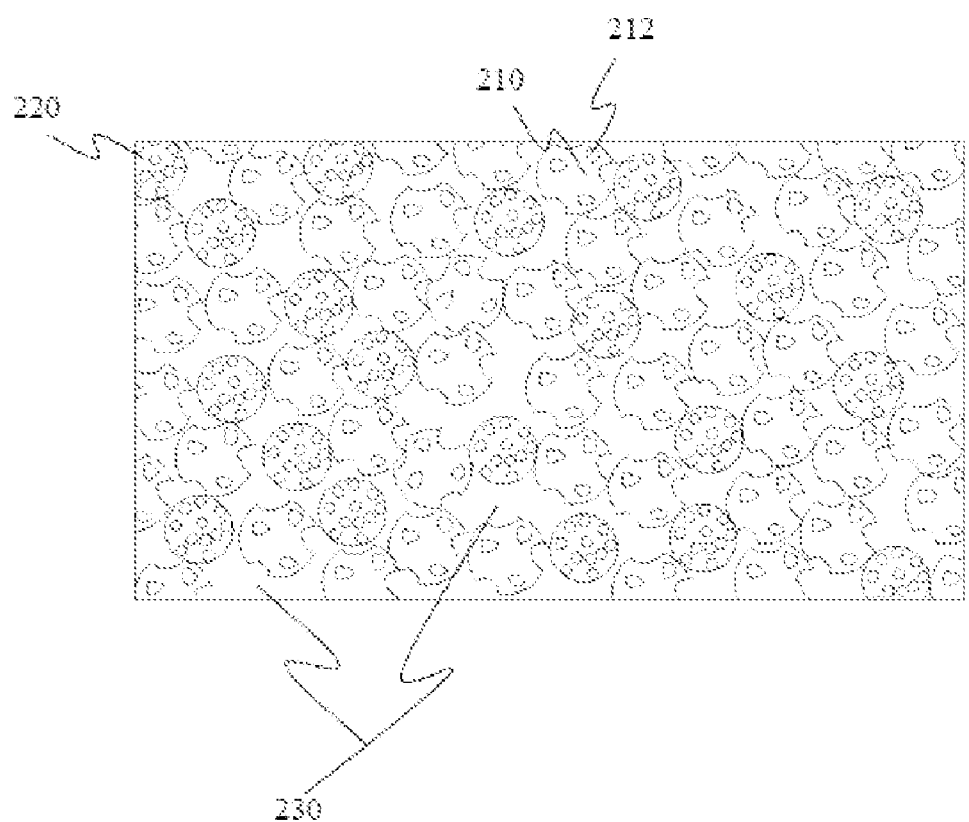
FIG. 2 illustrates a zeolite starch adhesive prepared before being heated up for use in corrugated cardboard, in which zeolite and porous starch are mixed together.

Please refer to FIG. 2. In the present invention, porous starch 210 is used to solve the bounding problem for zeolite starch adhesive. The pore size of porous starch is controlled and would improve the adhesive viscosity and initial adhesive strength by controlling the weight ratio of enzyme to starch. The present invention employs glucoamylase solution (AMG, product made from the Novozymes) and makes it act on starch. The novel combination of enzyme-treated porous starch, zeolite powder, caustic soda, borax and water shows similar initial adhesive time.

Figure 3:
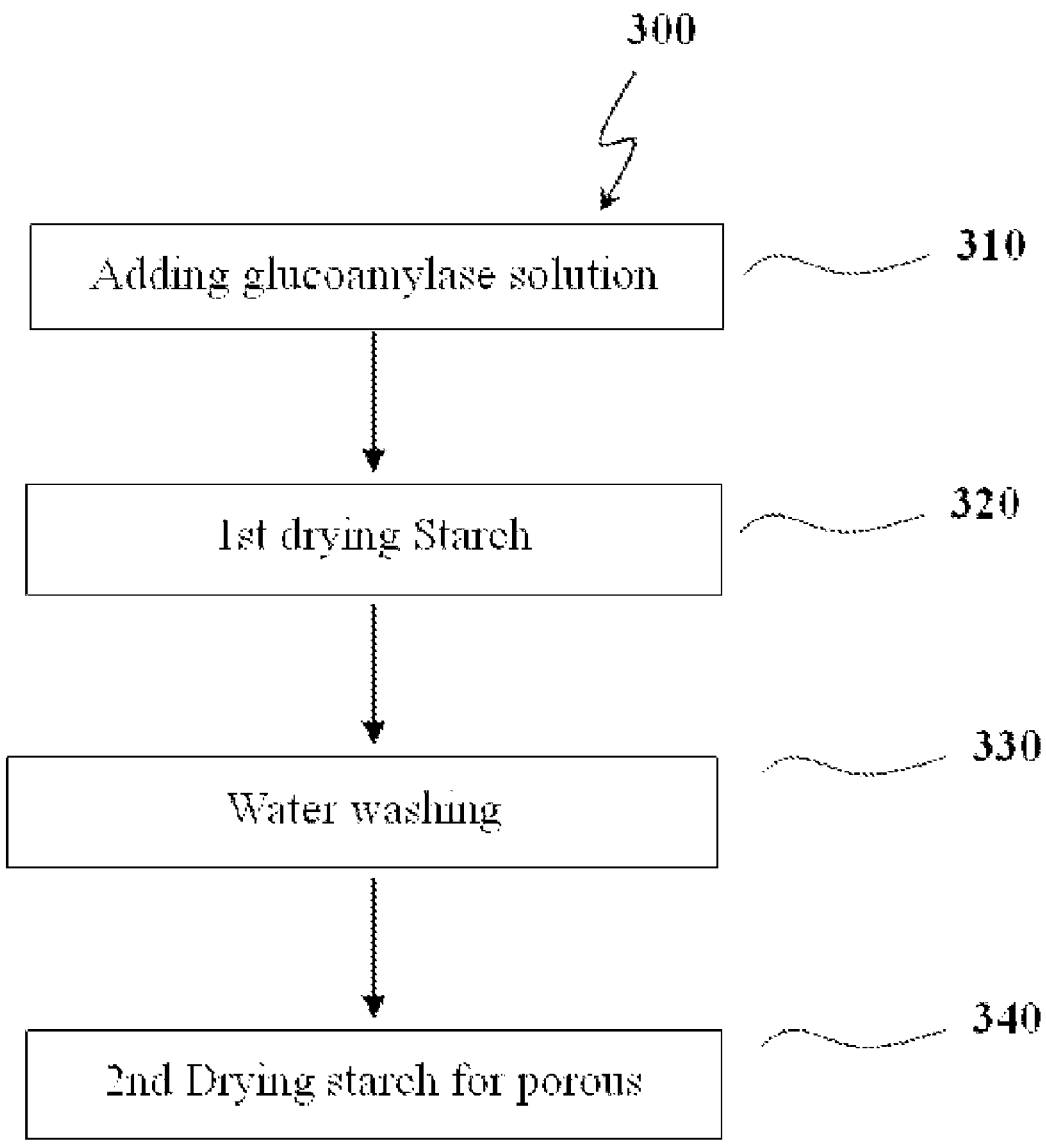
FIG. 3 illustrates a flow chat of the process for producing porous starch of the present invention.

FIG. 3 illustrates a flow chat of the process of producing porous starch of the present invention. In step 310, a glucoamylase solution (AMG, product made from the Novozymes) is added into a corn starch solution which is of a specific concentration ratio to water (general concentration is 40-50%) in an amount of proper weight ratio of glucoamylase to corn starch (general ratio is 0.02-0.5%), and is uniformly stirred for 12 hours at 40° C. to incubate the reaction.

In step 320, the corn starch is partly decomposed, and is dried after the conversion reaction is quenched to obtain a primary-treatment product. In step 330, distilled water is used to wash the primary-treatment product to remove the soluble decomposition product (part of corn starch is decomposed into dextrin and oligosaccharide which are soluble in water, and the starch is insoluble in water, so the primary-treatment article can be washed by water). In step 340, after the washing process, the corn starch is dried over and over again, and the porous starch is obtained.

Considering the characteristics of the enzymatic reaction and desirable pore size of porous starch, the present invention proposes an effective producing process. The enzymatic reaction is carried out at an optimal pH range suitable for glucoamylase, for example 4-6, and at its optimal temperature, 40-60° C. The average pore size of the porous starch then can be controlled by the enzyme addition. The preferred amount of dosage of the enzyme for present invention may be about 0.02-0.5% of the weight of the starch.

In the present invention, the average pore size of the porous starch is controlled in the range of 0.3-1 μm. The method to determine the average pore size of the porous starch is as follows. A scanning electron microscope is used to take the microphotographs of the starch magnified 1000 times or more. 10 starch granules are chosen to calculate the average pore size on the surface of starch. If an average pore size is obtained in the above mentioned range, the gelation temperature of the adhesive is predicted to be lowered without making the viscosity stability worse. If the average pore size exceeds lam, the viscosity stability of the adhesive would be definitely worse. It is speculated that the amylase chain or amylopectin chain of starch partly swells due to overreaction with glucoamylase. If the average pore size is smaller than 0.3 μm, the gelation temperature can not be lowered because the gelation temperature is highly affected by caustic soda for the swelling process of the starch. Caustic soda would penetrate into the existent holes of starch, then the starch swells. If the pore size is too small, the penetration effect of caustic soda on starch is not so significant as compared with the raw starch.

Figure 4:
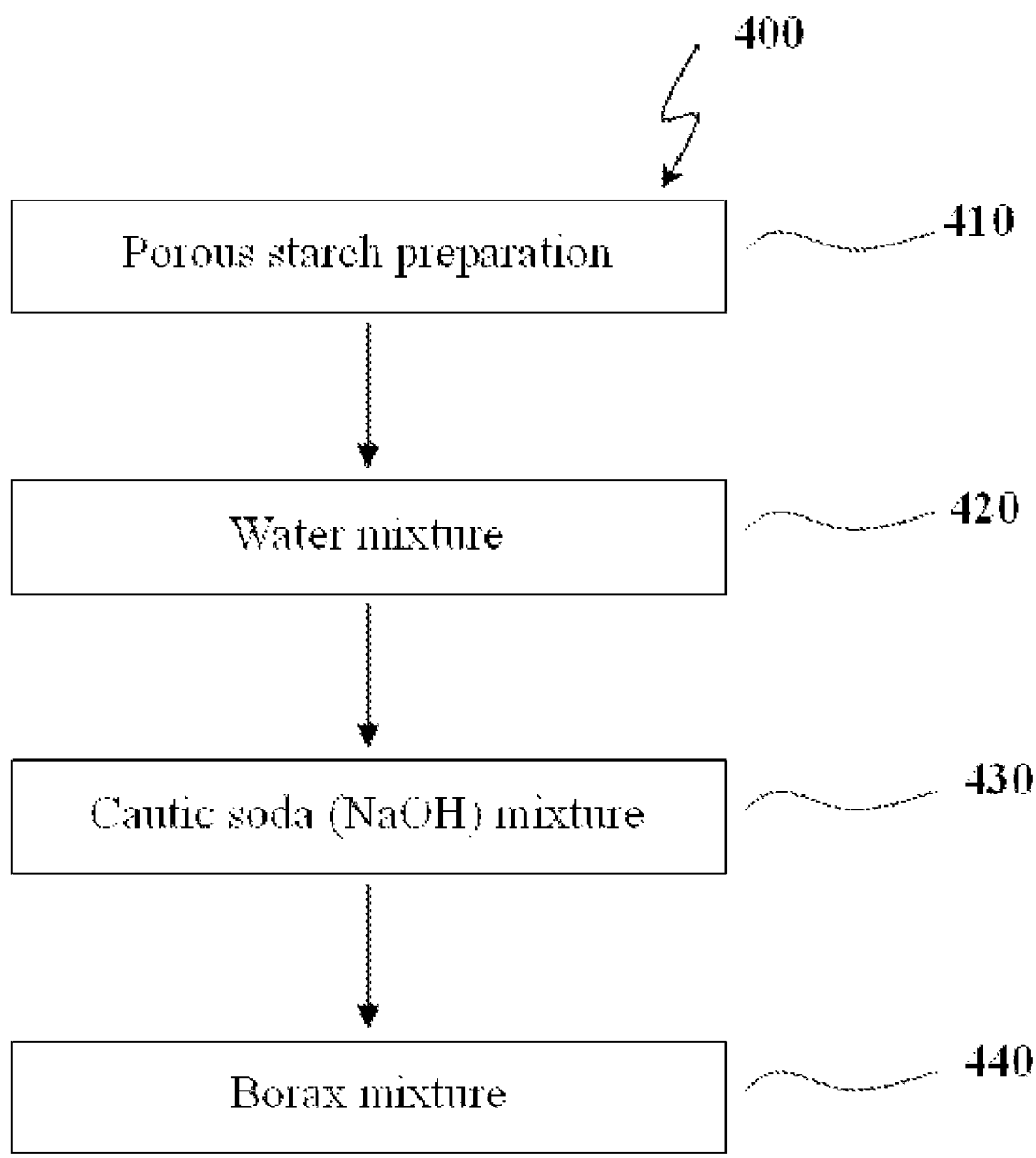
FIG. 4 illustrates a flow chat of the process for producing type-I zeolite starch adhesive.

FIG. 4 illustrates a flow chat of the process for producing type-I zeolite starch adhesive. In step 410, the corn starch is modified to be a desirable porous starch. In step 420, the porous starch is mixed with zeolite powder in an amount of zeolite powder being 20-33% of the total weight of the mixture of the starch and the zeolite powder then altogether added into water, properly stirred for a while (such as 5 minutes) to make the mixture of the porous starch and the zeolite powder dispersed evenly in water. In the present invention, although the weight ratio of water to the total weight of the starch and the zeolite powder (i.e. water/(starch+zeolite powder) ratio) is not limited, it is suggested that the ratio can be in the range of 1.5-5 in order to demonstrate the effect of the present invention.

In step 430, caustic soda preferably in an amount of 1-3% of the total weight of the mixture of starch and the zeolite powder is added into the solution obtained in step 420, properly stirred (such as for 20 minutes) to adjust the viscosity of adhesive.

In step 440, borax preferably in an amount of 0.2-5% of the total weight of the mixture of the starch and the zeolite powder is added into the solution obtained in step 430, properly stirred (such as for 25 minutes) to enhance the initial adhesive strength. Upon completion of all the steps, the adhesive can be used in the production of the corrugated cardboard of the present invention.

In the present invention, caustic soda and borax are used as additives to corrugate the cardboard adhesive. Caustic soda is employed in an amount of 1-3% of the total weight of the mixture of the starch and the zeolite powder. Caustic soda is expected to have a predicted effect on the gelation temperature of the adhesive. Of course, it is possible to use a base other than caustic soda, such as alkali metal silicates in solid or solution state. Borax is used in an amount of 0.2-5% of the total weight of the mixture the starch and the zeolite powder, and would make the adhesive liquid more stable. Borax also promotes the emergence of the initial adhesive strength.

Figure 5:
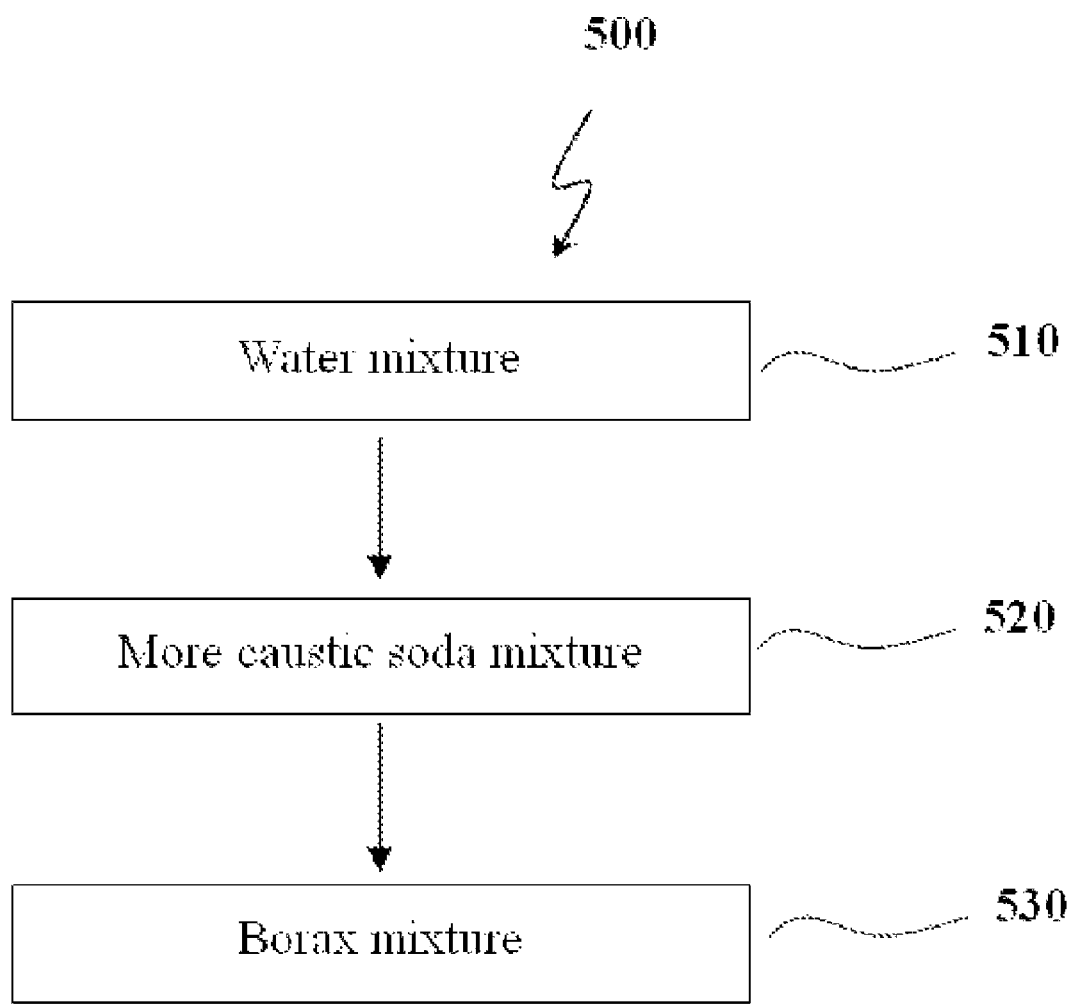
FIG. 5 illustrates a flow chat of the process for producing type-II zeolite starch adhesive

FIG. 5 illustrates a flow chart of the process for producing type-II zeolite starch adhesive. In step 510, the corn starch is mixed with zeolite powder in an amount of the zeolite powder being 20-33% of the total weight of the mixture of the starch and the zeolite powder and the mixture is added into water, properly stirred (such as for 5 minutes) to make the starch and the zeolite powder dispersed evenly in water. In the present invention, although the weight ratio of water to the amount of total weight of the starch and the zeolite powder (i.e. water/(starch+zeolite powder) ratio) is not limited, it is suggested that the ratio can be in the range of 1.5-5 in order to demonstrate the effect of the present invention.

In step 520, caustic soda is added in an amount of 1-3% of the total weight of the mixture of the starch and the zeolite powder. Furthermore, an extra amount of 20-30% of the predetermined amount of caustic soda is added into the solution obtained in step 510, properly stirred (such as for 20 minutes) to adjust the viscosity of the adhesive. If the adhesive should be stored for a long time, the starch adhesive stabilizer is added in an amount of 1% of the total weight of the mixture of the starch and the zeolite powder to stabilize the adhesive. In step 530, borax preferably is added in an amount of 0.2-5% of the total weight of the mixture of the starch and the zeolite powder into the solution in step 520, properly stirred (such as for 25 minutes) to enhance the initial adhesive strength. Upon completion of all the steps, the adhesive is ready for use in the production of corrugated cardboard.

The application of the zeolite starch adhesive of the present invention for the production of corrugated cardboards can be carried out by using current equipment with either type-I or type-II zeolite starch adhesive. As to the type-I zeolite starch adhesive, in step 300, i.e. the porous starch preparation process, can be done in a factory. According to the method disclosed in the present invention, the porous starch can therefore be prepared in a factory. Then, the porous starch is mixed/partly replaced with a desirable amount of zeolite powder for the production of the type-I zeolite starch adhesive. Alternatively, the present invention also discloses a type-II zeolite starch adhesive containing extra amount of caustic soda to achieve the desired adhesive characteristics as required.

Figure 6:
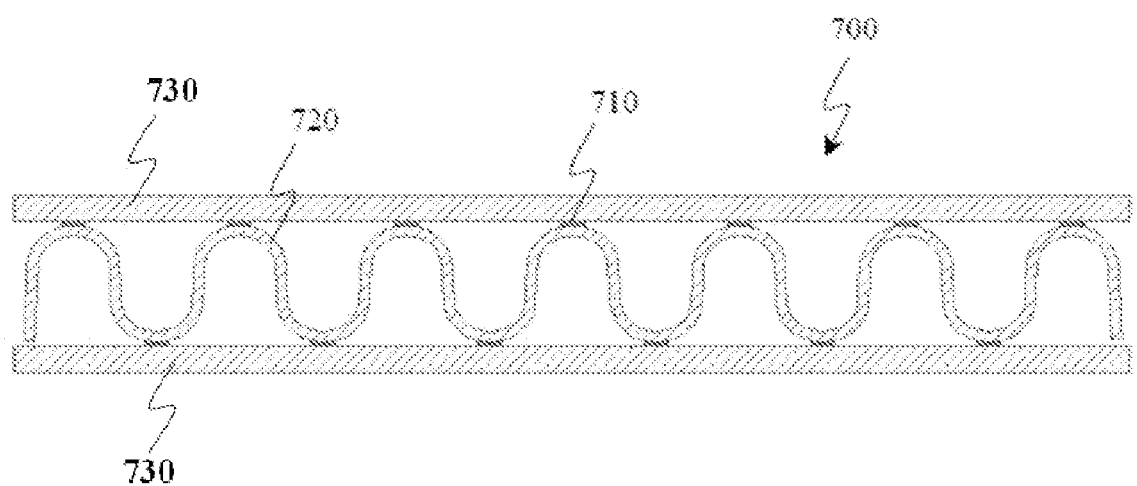
FIG. 6 illustrates a sectional view of the corrugated cardboard made in accordance with the present invention.

FIG. 6 illustrates a sectional view of the corrugated cardboard made in accordance with the present invention. The adhesive made in accordance with the present invention is applied to the tip of a corrugated medium, then the linerboards as well as the corrugated medium are pressed sequentially and separately for the bonding of the adhesive to obtain a corrugated board.

Test Methods for Adhesive and Corrugated Cardboard

Viscosity of Adhesive

The viscosity of an adhesive is measured by TU-4 cup viscometer. To determine the viscosity of an adhesive, the cup is dipped and completely filled with a sample adhesive. After the cup is elevated out of the sample adhesive, the user measures the time of the adhesive to drain off and to break up. The measured time is called corresponding "efflux time" which is considered as the viscosity of the sample adhesive.

Gelation Temperature

A beaker containing a sample adhesive is kept heated by a water bath, while stirred by a thermometer. When the viscosity of the sample adhesive starts rising sharply, the temperature indicated by the thermometer is determined to be the gelation temperature.

Initial Bonding Time

A sample adhesive is applied on the flute tips of a single-face corrugated cardboard by a PET roller, and the flute side lays downward. Next, a linerboard is placed on a 120° C. hot platen so that the hot platen would touch the flute tips of the single-face corrugated board simultaneously. A load 40 g/m2 is used to compress the two together. After a period of designated time, the visual judgment of the peeling condition is carried out. If 50-80% fibers of the flute tips are torn off, the time required is the initial bonding time.

Burst Strength

A specimen of corrugated board is clamped between two platens with circular opening in their centers. The lower platen is fixed while the upper platen has an adjustable depth but remains stationary for the rest of the test. An expansible diaphragm is distended through the lower platen by means of a hydraulic pressure until the specimen bursts. The maximum hydraulic pressure when the specimen ruptures, is recorded.

(Source: http://www.tappi.org/s_tappi/doc_bookstore.asp?CID=7373&DID=517338)

Flat Crush Strength

After cutting a specific area specimen of a corrugated cardboard, the specimen is placed between the platens of a compression tester and loaded until failure occurs. It is loaded perpendicular to its surface. The maximum loading, when the corrugated medium of specimen collapses, is recorded.

Flat crush strength(kgf/cm2)=maximum loading (kgf)/area of specimen(cm2)

Box Compression Strength

A 60 cm (length)×40 cm (width)×35 cm (height) box is placed between the platens of a box compression strength tester and loaded until failure occurs. The maximum loading when the box collapses, is recorded.

The test results are listed in Table 1 to Table 3.

TABLE 1

|  | Example No. | | | | | |
| --- | --- | --- | --- | --- | --- | --- |
|  | Example 1 | | Example 2 | | Example 3 | |
| Ratio of zeolite/(zeolite + starch) | 30% | | 30% | | 30% | |
| Additional amount of enzyme (opposite starch %) | 0.1 | | 0.5 | | 0.025 | |
| Average pore size (μm) | 0.5 | | 1 | | 0.3 | |
| Storage time of adhesive (hr) | 0 | 24 | 0 | 24 | 0 | 24 |
| Viscosity (s) | 22.1 | 22 | 20 | 21 | 22 | 23 |
| Gelation temperature (° C.) | 56 | 56.7 | 55.7 | 56.3 | 58.8 | 59.5 |
| Initial bonding time (s) | 10 | 10 | 9.9 | 10 | 11 | 11.5 |
| Burst strength (kgf/cm$^2$) | 10.4 | 10.7 | 10.3 | 10.4 | 10.5 | 10.6 |
| Flat crush strength (kgf/cm$^2$) | 20.8 | 20.8 | 20.6 | 20.6 | 20.9 | 20.7 |
| Box compression strength(kgf) | 440.8 | 441 | 438.9 | 439 | 441 | 440.9 |

|  | Example No. | | | |
| --- | --- | --- | --- | --- |
|  | Example 4 | | Example 5 | |
| Ratio of zeolite/(zeolite + starch) | 30% | | 30% | |
| Additional amount of enzyme (opposite starch %) | 0.01 | | 2.5 | |
| Average pore size (μm) | 0.2 | | 3.5 | |
| Storage time of adhesive(hr) | 0 | 24 | 0 | 24 |
| Viscosity (s) | 23.9 | 24 | 24 | More than 300 |
| Gelation temperature (° C.) | 58.8 | 59.9 | 55.6 | N/A |
| Initial bonding time (s) | 12 | 12.1 | 10 | N/A |
| Burst strength (kgf/cm$^2$) | 10.5 | 10.6 | 10.1 | N/A |
| Flat crush strength (kgf/cm$^2$) | 20.9 | 20.8 | 20 | N/A |
| Box compression strength(kgf) | 441 | 440 | 380 | N/A |

TABLE 2

|  | Example No. | | |
| --- | --- | --- | --- |
|  | Example 6 | Example 7 | Example 8 |
| Ratio of zeolite/(zeolite + starch) | 15% | 20% | 33% |
| Additional amount of enzyme (opposite starch %) | 0.1 | 0.1 | 0.1 |
| Average pore size (μm) | 0.5 | 0.5 | 0.5 |
| Storage time of adhesive(hr) | 0 | 24 | 0 | 24 | 0 | 24 |
| Viscosity (s) | 24 | 24.1 | 23.5 | 23 | 21 | 21 |
| Gelation temperature (° C.) | 56.1 | 56.6 | 56 | 56.5 | 57.9 | 56 |
| Initial bonding time (s) | 9.9 | 10 | 10.1 | 10 | 10.3 | 10.2 |
| Burst strength (kgf/cm$^2$) | 9.7 | 9.8 | 10.2 | 10.3 | 10.9 | 11.2 |
| Flat crush strength (kgf/cm$^2$) | 19.9 | 20 | 20.7 | 20.8 | 21.4 | 21.8 |
| Box compression strength(kgf) | 358.1 | 358.2 | 413.3 | 413.5 | 449.3 | 450 |

|  | Example No. Example 9 | |
| --- | --- | --- |
| Ratio of zeolite/(zeolite + starch) | 40% | |
| Additional amount of enzyme (opposite starch %) | 0.1 | |
| Average pore size (μm) | 0.5 | |
| Storage time of adhesive(hr) | 0 | 24 |
| Viscosity (s) | 20 | 20 |
| Gelation temperature (° C.) | 56 | 56.6 |
| Initial bonding time (s) | More than 300 | More than 300 |
| Burst strength (kgf/cm$^2$) | N/A | N/A |
| Flat crush strength (kgf/cm$^2$) | N/A | N/A |
| Box compression strength(kgf) | N/A | N/A |

TABLE 3

|  | Example No. | | |
| --- | --- | --- | --- |
|  | Comparative example 1 | Comparative example 2 | Comparative example 3* |
| Ratio of zeolite/(zeolite + starch) | 0 | 30% | 30% |
| Additional amount of enzyme (opposite starch %) | 0 | 0 | 0 |
| Average pore size (μm) | N/A | N/A | N/A |
| Storage time of adhesive (hr) | 0 | 24 | 0 | 24 | 0 | 24 |
| Viscosity (s) | 28.9 | 29 | 24 | 24 | 28 | More than 300 |
| Gelation temperature (° C.) | 58.7 | 59.8 | 58.7 | 59.8 | 55.7 | N/A |
| Initial bonding time (s) | 9.9 | 10.1 | 12 | 12.1 | 10 | N/A |
| Burst strength (kgf/cm$^2$) | 9.6 | 9.8 | 10.5 | 10.7 | 10.5 | N/A |
| Flat crush strength (kgf/cm$^2$) | 19.9 | 19.9 | 20.9 | 20.9 | 20.9 | N/A |
| Box compression strength(kgf) | 358 | 358.1 | 441 | 441.1 | 441 | N/A |

|  | No. Comparative example 4** |  |
| --- | --- | --- |
| Ratio of zeolite/(zeolite + starch) | 30% | |
| Additional amount of enzyme (opposite starch %) | 0 | |
| Average pore size (μm) | N/A | |
| Storage time of adhesive(hr) | 0 | 24 |
| Viscosity (s) | 28 | 28.2 |
| Gelation temperature (° C.) | 55.7 | 56 |
| Initial bonding time (s) | 10 | 10.2 |
| Burst strength (kgf/cm$^2$) | 10.6 | 10.5 |
| Flat crush strength (kgf/cm$^2$) | 20.7 | 20.8 |
| Box compression strength(kgf) | 440.5 | 440.9 |

*Additional amount of caustic soda increased 30%;
**Additional amount of caustic soda increased 30%' and the additional amount of starch adhesive stabilizer was 1% of the total weight of the mixture of starch and zeolite powder

EXAMPLES AND COMPARATIVE EXAMPLES

Example 1

The process of producing the porous starch 300 is in accordance with the illustrations of FIG. 3. In step 310, the glucoamylase solution (AMG, product made from the Novozymes) was added to 40% corn starch solution, with evenly stirring for 12 hours at 40° C. to incubate the reaction. The added amount of glucoamylase was 0.1% of the weight of the corn starch. In step 320, the corn starch is partly decomposed, and dried after the reaction is finished to obtain the primary-treatment product. In step 330, distilled water is used to wash the primary-treatment product to remove the soluble decomposed by-products. In step 340, after washing, the corn starch is dried, and porous starch is obtained.

The process of producing the type-I adhesive 400 is in accordance with the illustrations of FIG. 4. In step 410, the corn starch is modified to become porous starch. In step 420, a mixture of 1120 g porous starch and 480 g zeolite powder (porous starch:zeolite powder=7:3) is added to water of 25-30° C., stirring for 5 minutes to make the porous starch and the zeolite powder dispersed evenly in the water. In step 430, 31 g caustic soda is added, with stirring for 20 minutes to adjust the viscosity of the adhesive. In step 440, 32 g borax is added, with stirring for 25 minutes to enhance the initial adhesive strength. Afterward, the adhesive is ready for use in the manufacture of the corrugated cardboard.

Example 2

The adhesive is produced like Example 1 in the presence of 0.5% glucoamylase of the weight of the starch.

Example 3

The adhesive is produced like Example 1 in the presence of 0.025% glucoamylase of the weight of the starch.

Example 4

The adhesive is produced like Example 1 in the presence of 0.01% glucoamylase of the weight of the starch.

Example 5

The adhesive is produced like Example 1 in the presence of 2.5% glucoamylase of the weight of the starch.

Example 6

The adhesive is produced like Example 1 in the presence of an additional amount of zeolite powder into 15% of the total weight of the mixture of starch and zeolite powder.

Example 7

The adhesive is produced like Example 1 in the presence of an additional amount of zeolite powder into 20% of the total weight of the mixture of starch and zeolite powder.

Example 8

The adhesive is produced like Example 1 in the presence of an additional amount of zeolite powder into 33% of the total weight of the mixture of starch and zeolite powder.

Example 9

The adhesive is produced like Example 1 in the presence of an additional amount of zeolite powder into 40% of the total weight of the mixture of starch and zeolite powder.

Comparative Example 1

The adhesive is produced like Example 1 in the absence of glucoamylase and the zeolite powder is replaced with raw starch.

Comparative Example 2

The adhesive is produced like Example 1 in the absence of glucoamylase.

Comparative Example 3

The adhesive is produced like Example 1 in the absence of glucoamylase and in the presence of a 30% additional amount of caustic soda.

Comparative Example 4

The adhesive is produced like Example 1 in the absence of glucoamylase, in the presence of a 30% additional amount of caustic soda and a starch adhesive stabilizer which is in an amount of 1% of the total weight of the starch and the zeolite powder.

Table 1 and Table 3 show that Examples 1-3 and Comparative example 4 are able to maintain the viscosity stability with the passage of time compared with Example 5 and Comparative example 3. The gelation temperature of Examples 1-3 and Comparative example 4 is definitely lowered compared with Example 4 and Comparative example 1 and 2. The results demonstrate that the initial bonding time decreases due to the drop of the gelation temperature. Therefore, the adhesive with zeolite powder can be applied to high-speed pasting.

Tables 1-3 show that the burst strength, the flat crush strength and the box compression strength of Examples 1-4, 7, and 8 and Comparative examples 2 and 4 are improved compared with Comparative example 1, as well as the box compression strength is increased significantly. At the same additional amount of glucoamylase, the strength of Example 8 is better than Example 1 and Example 1 is better than Example 7, respectively. The results demonstrate that the strength increases with the increase amount of the zeolite powder. There is no substantial difference between Example 1 and Example 6 in term of strength because the strength cannot be improved with less, insufficient addition of the zeolite powder. In addition, due to exceeding addition of the zeolite powder, the initial adhesive strength of Example 9 is not enough.

Those skilled in the art will readily observe that numerous modifications and alterations of the device and method may be made while retaining the teachings of the invention.

What is claimed is:

1. A absorptive adhesive for corrugated cardboards, comprising corn starch as a main ingredient as well as caustic soda and borax as auxiliary ingredients, characterized in that part of said corn starch is replaced by zeolite powder in an amount of 20-33% of the total weight of said corn starch and said zeolite powder, and said absorptive adhesive is adjusted to have a lower gelation temperature.

2. The absorptive adhesive for corrugated cardboards of claim 1, wherein said zeolite powder is in an amount of 30% of the total weight of said corn starch and said zeolite powder.

3. The absorptive adhesive for corrugated cardboards of claim 1, wherein said caustic soda is in an amount of 1-3% of the total weight of said corn starch and said zeolite powder.

4. The absorptive adhesive for corrugated cardboards of claim 1, wherein said borax is in an amount of 0.2-5% of the total weight of said corn starch and said zeolite powder.

5. The absorptive adhesive for corrugated cardboards of claim 1, wherein said corn starch is porous corn starch so that said absorptive adhesive has the lower gelation temperature.

6. The absorptive adhesive for corrugated cardboards of claim 5, wherein said porous corn starch has an average pore size of 0.3-1 µm.

7. The absorptive adhesive for corrugated cardboards of claim 6, wherein said porous corn starch of the average pore size of 0.3-1 µm is obtained by partial conversion of said corn starch by the addition of glucoamylase.

* * * * *